US012760753B2

(12) United States Patent
Kondo et al.

(10) Patent No.: US 12,760,753 B2
(45) Date of Patent: Oct. 13, 2026

(54) PUMP CALIBRATION SYSTEM AND METHOD FOR A HYDRAULIC PUMP OF A VARIABLE CAPACITY

(71) Applicant: KAWASAKI JUKOGYO KABUSHIKI KAISHA, Kobe (JP)

(72) Inventors: Akihiro Kondo, Kobe (JP); Kazuya Iwabe, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 324 days.

(21) Appl. No.: 18/595,792

(22) Filed: Mar. 5, 2024

(65) Prior Publication Data

US 2024/0301898 A1 Sep. 12, 2024

(30) Foreign Application Priority Data

Mar. 10, 2023 (JP) ................................ 2023-038087

(51) Int. Cl.
*F15B 19/00* (2006.01)
*F04B 51/00* (2006.01)

(52) U.S. Cl.
CPC ............ *F15B 19/002* (2013.01); *F04B 51/00* (2013.01)

(58) Field of Classification Search
CPC ..................................................... F15B 19/002
See application file for complete search history.

(56) References Cited

U.S. PATENT DOCUMENTS

2021/0156373 A1* 5/2021 Shimamoto ............. F04B 49/08
2022/0106770 A1* 4/2022 Muraoka ................. F15B 11/17
2023/0049890 A1* 2/2023 Kondo ................ F15B 11/0423
2025/0092870 A1* 3/2025 Kondo .................. F04B 49/065

FOREIGN PATENT DOCUMENTS

JP 2019190443 A 10/2019
JP 2022076550 A * 5/2022 .............. F04B 51/00

* cited by examiner

*Primary Examiner* — Suresh Suryawanshi
(74) *Attorney, Agent, or Firm* — Alleman Hall LLP

(57) ABSTRACT

A pump calibration system includes a hydraulic pump of a variable capacity type, a regulator that changes a discharge capacity according to a command signal, an unloader valve having a variable opening degree, a pressure sensor that measures a discharge pressure, and a control device that controls the discharge capacity and calibrates a pump characteristic. The control device stores a first reference pressure detected by the pressure sensor when a first reference signal is output under a measurement condition in which the opening degree of the unloader valve is fixed and the pump is driven to rotate a predetermined amount, and when a calibration condition is satisfied, changes the command signal so that the discharge pressure becomes the first reference pressure, and calibrates the pump characteristic on the basis of a first actual signal that is the command signal with which the discharge pressure is the first reference pressure.

6 Claims, 7 Drawing Sheets

PUMP CALIBRATION SYSTEM AND METHOD FOR A HYDRAULIC PUMP OF A VARIABLE CAPACITY

CROSS REFERENCE TO RELATED APPLICATION

The present application is based on and claims priority of Japanese Patent Application No. 2023-038087 filed on Mar. 10, 2023, the description of which is incorporated herein by reference.

FIELD

The present disclosure relates to a pump calibration system that calibrates a pump characteristic indicating the relationship between a signal and the discharge capacity of a hydraulic pump.

BACKGROUND

A hydraulic pump of the variable capacity type with a discharge capacity varying on the basis of a current command value is used as a hydraulic pump to be included in construction equipment, industrial equipment, or the like. The discharge capacity of a hydraulic pump of the variable capacity type is variable depending on a current command value that is output according to a current flow rate characteristic (that is the I-q characteristic and is the pump characteristic). However, the current flow rate characteristic changes, for example, by replacing a component. This results in a failure to discharge a working fluid from the hydraulic pump at a desired flow rate. Therefore, it is preferable that the current flow rate characteristic be calibrated.

In the calibration system disclosed in Patent Literature (PTL) 1, a pump pressure is measured for each current command value obtained by changing a current command value in a multi-step manner. Furthermore, in the calibration system, a coefficient indicating the relationship between a pump pressure and a pump flow rate is calculated for each pump pressure. Moreover, in the calibration system, each pump pressure is converted into a pump flow rate using the coefficient. Subsequently, in the calibration system, the pump flow rate obtained by the conversion and the current command value are associated with each other, and thus the current flow rate characteristic is calibrated.

CITATION LIST

Patent Literature

PTL 1: Japanese Laid-Open Patent Application Publication No. 2019-190443

SUMMARY

Technical Problem

In the calibration system disclosed in PTL 1, it is necessary to perform multiple steps including the pump pressure measurement, the coefficient calculation, and the conversion into a flow rate using the coefficient, as described above. However, regarding calibration of the current flow rate characteristic, there is a demand for more simple calibration. Specifically, a pump calibration system is desirable that is capable of easily calibrating a pump characteristic indicating the relationship between the discharge capacity of a hydraulic pump and an electric current (that is, a command signal).

Thus, an object of the present disclosure is to provide a pump calibration system capable of easily calibrating a pump characteristic indicating the relationship between the discharge capacity of a hydraulic pump and a command signal.

Solution to Problem

A pump calibration system according to the present disclosure includes: a hydraulic pump of a variable capacity type having a discharge capacity that is variable; a regulator that changes the discharge capacity of the hydraulic pump according to a command signal that is input to the regulator; an unloader valve disposed between the hydraulic pump and a tank and having an opening degree that is variable; a pressure sensor that measures a discharge pressure of the hydraulic pump; and a control device that controls the discharge capacity of the hydraulic pump by outputting the command signal to the regulator and calibrates a pump characteristic indicating a relationship between the command signal and the discharge capacity or a discharge flow rate of the hydraulic pump. The control device stores, as a first reference pressure in advance, a pressure detected by the pressure sensor when a first reference signal that is predetermined is output to the regulator under a measurement condition in which the opening degree of the unloader valve is fixed to a predetermined value and the hydraulic pump is driven to rotate at a predetermined number of revolutions, and when a predetermined calibration condition is satisfied, changes the command signal that is output to the regulator so that the discharge pressure detected by the pressure sensor under the measurement condition becomes the first reference pressure, and calibrates the pump characteristic on the basis of a first actual signal that is the command signal with which the discharge pressure is the first reference pressure.

According to the present disclosure, the pump characteristic can be calibrated with reference to the stored pump characteristic. The pump characteristic is calibrated on the basis of the first actual signal with which the discharge pressure is equal to the discharge pressure detected when the first reference signal is output. Therefore, it is possible to easily calibrate the pump characteristic without using a flowmeter.

A pump calibration method according to the present disclosure is a method for calibrating a pump characteristic indicating a relationship between a discharge capacity or a discharge flow rate of a hydraulic pump of a variable capacity type and a command signal that is input to a regulator in changing of the discharge capacity by the regulator. The pump calibration method includes: storing a first reference pressure detected by a pressure sensor when the regulator changes the discharge capacity of the hydraulic pump according to a first reference signal that is input to the regulator under a measurement condition in which an opening degree of an unloader valve disposed between the hydraulic pump and a tank is fixed to a predetermined value, the measurement condition being predetermined; deriving a first actual signal by changing the command signal that is output to the regulator under the measurement condition, the first actual signal being the command signal with which a discharge pressure of the hydraulic pump is the first reference pressure; and calibrating the pump characteristic on the basis of the first actual signal. In the storing, the first reference pressure is detected before a calibration condition that is predetermined is satisfied. In the deriving, after the calibration condition is satisfied, the command signal that is output to the regulator is changed to derive the first actual signal.

According to the present disclosure, the first reference pressure is detected before the calibration condition is satisfied, and after the calibration condition is satisfied, a signal that is output to the regulator is changed so that the discharge pressure becomes the first reference pressure, and thus the first actual signal is derived. Therefore, the pump characteristic obtained after the calibration condition is satisfied can be calibrated with reference to the pump characteristic obtained before the calibration condition is satisfied. Thus, the pump characteristic is calibrated on the basis of the first actual signal with which the discharge pressure is equal to the discharge pressure detected when the first reference signal is output. Therefore, it is possible to easily calibrate the pump characteristic without using a flowmeter.

Advantageous Effects

According to the present disclosure, a pump characteristic indicating the relationship between the discharge capacity of a hydraulic pump and a command signal can be calibrated.

The above object, other objects, features, and advantages of the present disclosure will be made clear by the following detailed explanation of preferred embodiments with reference to the attached drawings.

DESCRIPTION OF EMBODIMENTS

Hereinafter, pump calibration systems 1, 1A according to Embodiments 1, 2 of the present disclosure will be described with reference to the foregoing drawings. Note that the concept of directions mentioned in the following description is used for the sake of explanation; the orientations, etc., of elements according to the present disclosure are not limited to these directions. Each of the pump calibration systems 1, 1A described below is merely one embodiment of the present disclosure. Thus, the present disclosure is not limited to the embodiments and may be subject to addition, deletion, and alteration within the scope of the essence of the present disclosure.

Embodiment 1

Figure 1:
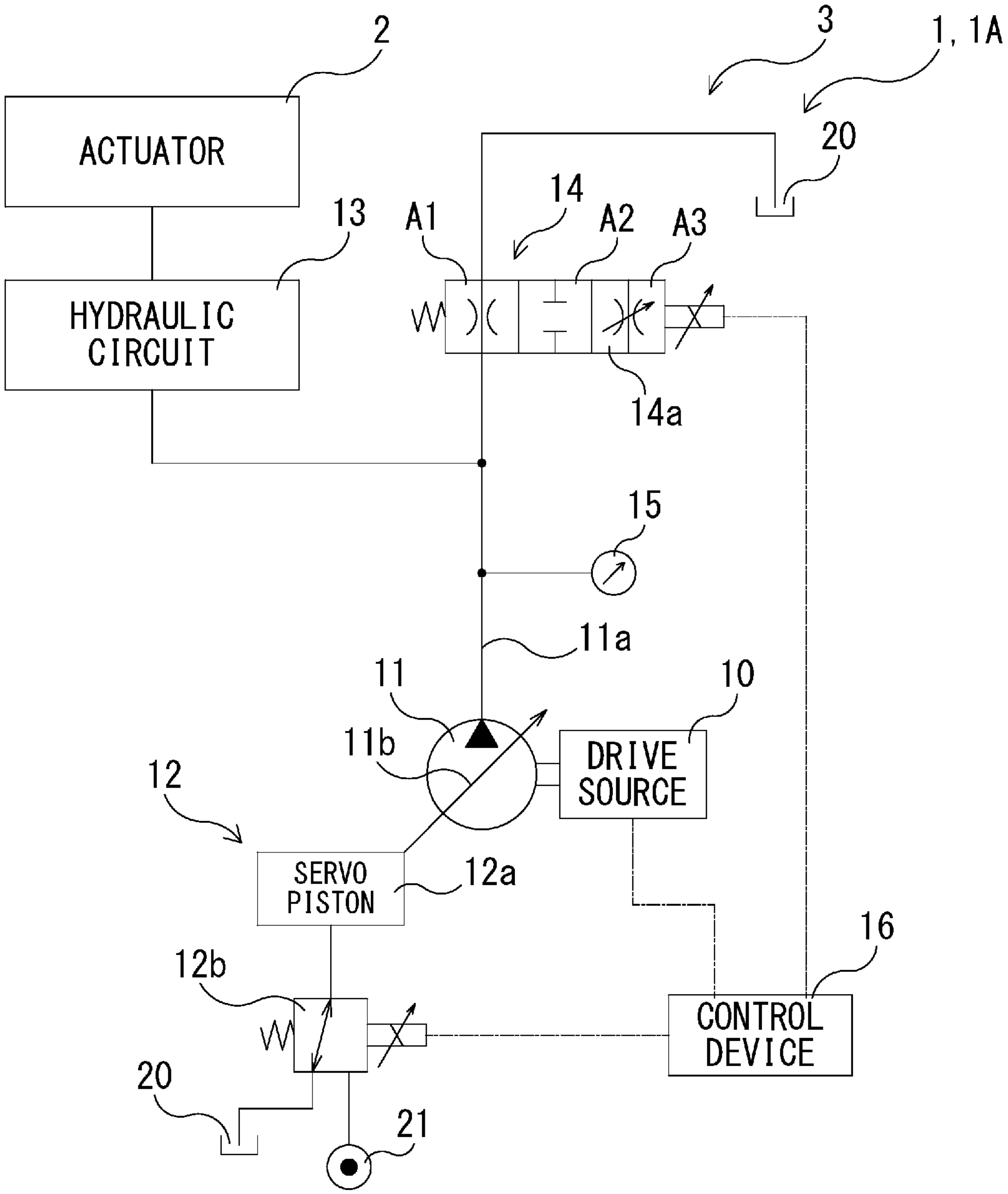
FIG. 1 is a circuit diagram illustrating a hydraulic drive system including a pump calibration system according to Embodiment 1.

A pump calibration system 1 illustrated in FIG. 1 is included in hydraulic equipment (not illustrated in the drawings), for example. Examples of the hydraulic equipment include work vehicles that are construction vehicles such as a hydraulic excavator and a hydraulic crane and industrial vehicles such as a forklift. Note that the hydraulic equipment is not limited to a work vehicle and may be a farm equipment, a ship or boat, hydrogen-related equipment, medical equipment, or the like. The hydraulic equipment includes at least one actuator 2 and a hydraulic drive system 3 including the pump calibration system 1. Examples of the actuator 2 include a hydraulic cylinder and a hydraulic motor. The hydraulic drive system 3 supplies the working fluid to the actuator 2 and drains the working fluid from the actuator 2. This actuates the actuator 2, allowing the hydraulic equipment to perform various tasks. More specifically, the hydraulic drive system 3 includes a hydraulic pump 11, a regulator 12, a hydraulic circuit 13, an unloader valve 14, a pressure sensor 15, and a control device 16. The pump calibration system 1 includes at least the hydraulic pump 11, the regulator 12, the unloader valve 14, the pressure sensor 15, and the control device 16.

The hydraulic pump 11 is driven to rotate by a drive source (for example, an engine or an electric motor) 10. By being driven to rotate, the hydraulic pump 11 discharges the working fluid to a pump passage 11*a*. The hydraulic pump 11 is a pump of the variable capacity type. In the present embodiment, the hydraulic pump 11 is a swash plate pump of the variable capacity type and changes the discharge capacity thereof by tilting a swash plate 11*b*. Note that the hydraulic pump 11 may be an axial piston pump of the variable capacity type; it is sufficient that the hydraulic pump 11 be a pump with a variable discharge capacity that is capable of discharging the working fluid.

The regulator 12 changes the discharge capacity of the hydraulic pump 11 according to a command signal that is input to the regulator 12. Note that the command signal is a current signal in the present embodiment. However, the signal is not limited to the current signal and may be a voltage signal or a controller area network (CAN) signal. The regulator 12 includes a servo piston 12*a* and an electromagnetic proportional valve 12*b*, for example. The servo piston 12*a* is connected to the swash plate 11*b*. The servo piston 12*a* moves to a position corresponding to a pilot pressure that is input to the servo piston 12*a*. When the servo piston 12*a* moves, the swash plate 11*b* is tilted. Thus, the discharge capacity of the hydraulic pump 11 is adjusted to a level of capacity corresponding to the received pilot pressure. Note that a discharge pressure is brought to the servo piston 12*a*, but illustration of a passage for the discharge pressure is omitted in FIG. 1.

The electromagnetic proportional valve 12*b* outputs a pilot pressure corresponding to a command signal. More specifically, the electromagnetic proportional valve 12*b* is connected to a pilot pump 21, a tank 20, and the regulator 12, for example. By adjusting the opening degree of a passage leading to each of the pilot pump 21 and the tank 20, the electromagnetic proportional valve 12*b* outputs the pilot pressure corresponding to the command signal to the servo piston 12*a*. The pilot pressure acts on the servo piston 12*a* against the discharge pressure that is brought to the servo piston 12*a*, and the servo piston 12*a* moves to a position corresponding to the pilot pressure. Thus, the discharge capacity of the hydraulic pump 11 changes. In other words, the regulator 12 changes the discharge capacity of the hydraulic pump 11 according to the command signal. Note that the electromagnetic proportional valve 12*b* is not limited to that described thus far as long as the electromagnetic proportional valve 12*b* can output the pilot pressure corresponding to the command signal.

The hydraulic circuit 13 is connected to each of the hydraulic pump 11 and at least one actuator 2. More specifically, the hydraulic circuit 13 is connected to the hydraulic pump 11 via the pump passage 11*a*. Furthermore, the hydraulic circuit 13 brings, to the actuator 2, the working fluid discharged from the hydraulic pump 11. The hydraulic circuit 13 controls the flow of the working fluid that flows from the hydraulic pump 11 to the actuator 2. The hydraulic circuit 13, which includes various valves such as a relief valve and a control valve, for example, actuates the various valves and thereby controls the flow of the working fluid.

The unloader valve 14 is disposed between the hydraulic pump 11 and the tank 20. The unloader valve 14 can change the opening degree between the hydraulic pump 11 and the tank 20 (hereinafter, referred to as "the opening degree of the unloader valve 14"). More specifically, the unloader valve 14 is connected on the upstream side of the hydraulic circuit 13 in the pump passage 11*a*. Note that the unloader valve 14 may be connected on the downstream side of the hydraulic circuit 13 in the pump passage 11*a*. The unloader valve 14 allows the working fluid discharged from the hydraulic pump 11 to be drained to the tank 20, thereby placing the hydraulic pump 11 in the unloaded state. In the present embodiment, the unloader valve 14 is a three-position spool valve. Specifically, the unloader valve 14 includes a spool 14*a* which is a valve body. The spool 14*a* moves to one of the first to third positions according to a position signal that is input thereto. The spool 14*a* at the first position A1 fixes the opening degree of the unloader valve 14 to a predetermined value. The spool 14*a* at the second position A2 blocks the path between the hydraulic pump 11 and the tank 20. The spool 14*a* at the third position A3 changes the opening degree of the unloader valve 14 according to a stroke. Note that the unloader valve 14 is not limited to a three-position spool valve, but may be a two-position spool valve.

The pressure sensor 15 measures the discharge pressure of the hydraulic pump 11. More specifically, the pressure sensor 15 is connected to the pump passage 11*a*. In the present embodiment, the pressure sensor 15 is connected on the upstream side of the unloader valve 14 in the pump passage 11*a*. The pressure sensor 15 measures, as the discharge pressure of the hydraulic pump 11, the pressure of the working fluid flowing through the pump passage 11*a*.

The control device 16 obtains the discharge pressure of the hydraulic pump 11 from the pressure sensor 15. The control device 16 controls the drive source 10, the regulator 12, the hydraulic circuit 13, and the unloader valve 14. More specifically, the control device 16 controls the regulator 12 by outputting the command signal to the regulator 12 according to the pump characteristic indicated by the solid line in FIG. 2. Note that the pump characteristic is a function indicating the relationship between the command signal (that is, an electric current) and the discharge capacity of the hydraulic pump 11. More specifically, the pump characteristic is a function indicating the discharge capacity to be controlled by the regulator 12 with respect to the command signal. In the present embodiment, the discharge capacity is a reference discharge capacity q0 when the command signal is a first reference signal I0; for example, the pump characteristic is measured in advance (for example, at the time of manufacture) and thus stored in the control device 16. The control device 16 controls the discharge capacity of the hydraulic pump 11 by outputting the command signal to the regulator 12 (in the present embodiment, the electromagnetic proportional valve 12*b*) according to the pump characteristic. Thus, the discharge capacity of the hydraulic pump 11 is controlled according to the command signal.

The control device 16 outputs a position signal to the unloader valve 14. With this, the position and the stoke of the spool 14*a* are controlled. Furthermore, the amount of the working fluid to be drained from the hydraulic pump 11 to the tank 20 is controlled, and the control device 16 outputs a command to the hydraulic circuit 13. Thus, the flow of the working fluid that flows from the hydraulic pump 11 to the actuator 2 is controlled. Moreover, the control device 16 controls the drive source 10. Thus, the speed of rotation of the hydraulic pump 11 is adjusted.

Furthermore, the control device 16 constitutes the pump calibration system 1 together with the hydraulic pump 11, the regulator 12, the unloader valve 14, and the pressure sensor 15, as mentioned above. The control device 16 can calibrate the pump characteristic together with these elements. More specifically, the control device 16 calibrates the pump characteristic by performing the pump calibration method to be described in detail later.

Note that the control device 16 includes memory and a processor that are not illustrated in the drawings. The memory stores a result of the detection by the pressure sensor 15. Furthermore, the memory stores various programs so that the operations of the regulator 12, the hydraulic circuit 13, and the unloader valve 14 are controlled and the pump calibration method is performed, for example. Subsequently, the processor performs the program stored in the memory, thereby actuates the regulator 12, the hydraulic circuit 13, and the unloader valve 14, and performs the pump calibration method.

<Pump Calibration Method>

In the hydraulic drive system 3, the pump characteristic will change due to component replacement, deterioration over time, and the like. Thus, in the pump calibration method, the pump characteristic is calibrated after a predetermined calibration condition is satisfied. The predetermined calibration condition is, for example, to select a calibration mode. More specifically, the pump calibration system 1 includes an input device not illustrated in the drawings. Using the input device, a worker or the like can select an initial state storage mode or the calibration mode as a mode. The initial state storage mode is a mode for storing the state value (that is a first reference pressure pd to be described later in the present embodiment) of the state before the calibration condition is satisfied (that is the initial state of a product, for example, the state thereof at the time of manufacture, in the present embodiment). The calibration mode is a mode for calibrating the current pump characteristic according to the first reference pressure pd in the state before the calibration condition is satisfied (that is the initial state of a product in the present embodiment). Note that the calibration condition may be, for example, to replace at least a portion of the regulator 12. The calibration condition may be degradation of the hydraulic pump 11 over time (that is, the use of the hydraulic pump 11 for at least a predetermined number of years), replacement of the hydraulic pump 11, or execution of the task of maintaining the hydraulic pump 11 or the regulator 12, for example.

Figure 3:
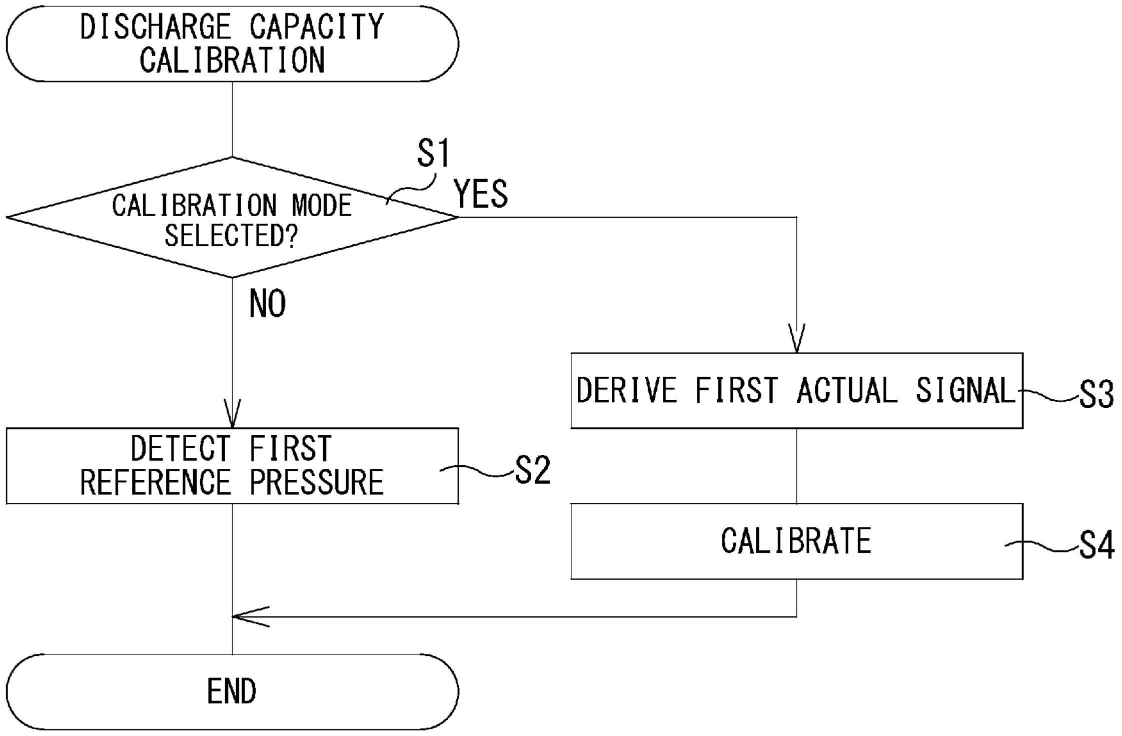
FIG. 3 is a flowchart illustrating the procedure in a pump calibration method performed by the pump calibration system illustrated in FIG. 1.

In the pump calibration method, the pump characteristic is calibrated on the basis of the state observed at the timing to be referred to for calibration of the pump characteristic, for example, the state value of the state observed before the calibration condition is satisfied. Thus, in the pump calibration method, the first reference pressure pd is stored in advance as the state value of the hydraulic equipment at the time of manufacture. Furthermore, in the pump calibration method, when the predetermined calibration condition is satisfied, the pump characteristic is calibrated on the basis of the first reference pressure pd. When the pump characteristic is calibrated as a result of the calibration condition being satisfied, the discharge capacity of the hydraulic pump 11 is controlled according to a desired capacity. In such a pump calibration method, the pump characteristic is calibrated according to a procedure such as that indicated in the flow in FIG. 3. Hereinafter, the procedure in the pump calibration method will be described in detail with reference to FIG. 3.

More specifically, when a mode is selected via the input device not illustrated in the drawings, the control device 16 starts the pump calibration method. When the pump calibration method is started, the processing transitions to Step S1. In Step S1 which is a calibration condition determination step, whether the predetermined calibration condition is satisfied is determined. More specifically, the control device 16 determines whether the calibration mode is selected. When the initial state storage mode is selected, the processing proceeds to Step S2. On the other hand, when the calibration mode is selected, the processing proceeds to Step S3.

Figure 4:
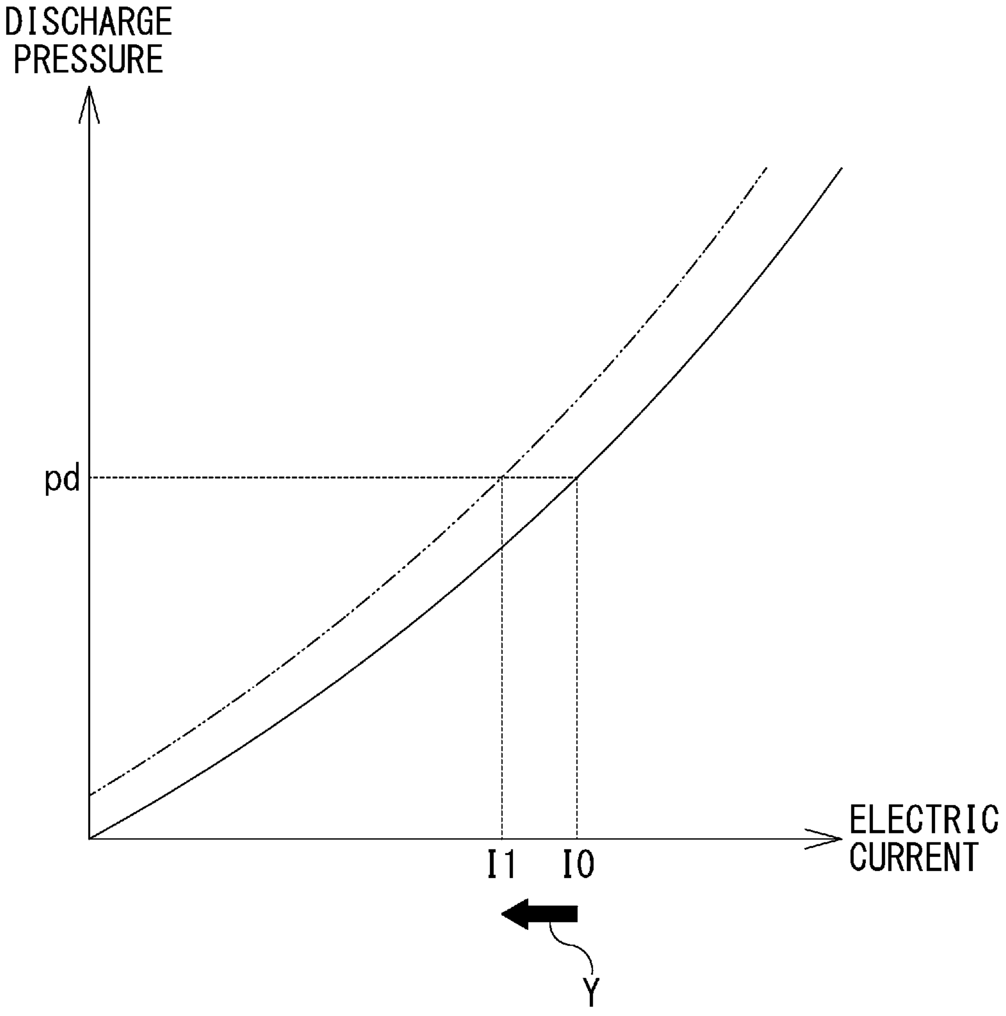
FIG. 4 is a graph illustrating the relationship between a discharge pressure and a command signal in the pump calibration system illustrated in FIG. 1.

In Step S2 which is a first reference voltage detection step, the predetermined first reference signal I0 is input to the regulator 12 (more specifically, the electromagnetic proportional valve 12*b*) under a reference condition that is a predetermined measurement condition (refer to the first reference signal I0 in the graph illustrated in FIG. 4). The reference condition is to fix the opening degree of the unloader valve 14 to a predetermined value. In the present embodiment, the reference condition is that the spool 14*a* of the unloader valve 14 is located at the first position A1 and thus the opening degree of the unloader valve 14 is fixed to the predetermined value and that the operation is performed at a desired number of pump revolutions. More specifically, the control device 16 maintains the number of revolutions of the hydraulic pump 11 at a predetermined number of revolutions under the reference condition. Furthermore, the total amount of the working fluid from the hydraulic pump 11 is drained from the unloader valve 14 to the tank 20 under the reference condition. For example, the control device 16 stops the working fluid from flowing from the hydraulic circuit 13 to the actuator 2, more specifically, closes various valves of the hydraulic circuit 13. Under such a reference condition, when the first reference signal I0 is input, the regulator 12 changes the discharge capacity of the hydraulic pump 11 according to the first reference signal I0. Subsequently, the control device 16 stores the first reference pressure pd detected by the pressure sensor 15 after the discharge capacity is changed according to the first reference signal I0 (refer to the first reference pressure pd in FIG. 4). Note that the solid line in FIG. 4 is a graph indicating a change in the discharge pressure that is observed when the command signal is changed under the reference condition before the calibration condition is satisfied. When the control device 16 stores the first reference pressure pd in advance, the pump calibration method ends for the moment. Subsequently, when a mode is selected again via the input device, the pump calibration method is started, and the processing transitions to Step S1.

In Step S3 which is a first actual signal derivation step, the control device 16 changes the command signal under the reference condition (for example, refer to the arrow Y in FIG. 4). Specifically, the control device 16 changes the command signal from the first reference signal I0. As a result, the discharge capacity of the hydraulic pump 11 changes. By changing the discharge pressure, the control device 16 derives a first actual signal I1 which is a signal with which the discharged pressure detected by the pressure sensor 15 is the first reference pressure pd (refer to the first actual signal I1 in FIG. 4). Note that the dash-dot-dot-dash line in FIG. 4 is a graph indicating a change in the discharge pressure that is observed when the command signal is changed under the reference condition after the calibration condition is satisfied. Note that the relationship between the electric current and the discharge capacity at this time is different from the relationship stored in Step S2 as a result of a change over time, a change in the regulator, or the like. When the first actual signal I1 is derived, the processing transitions to Step S4.

Figure 2:
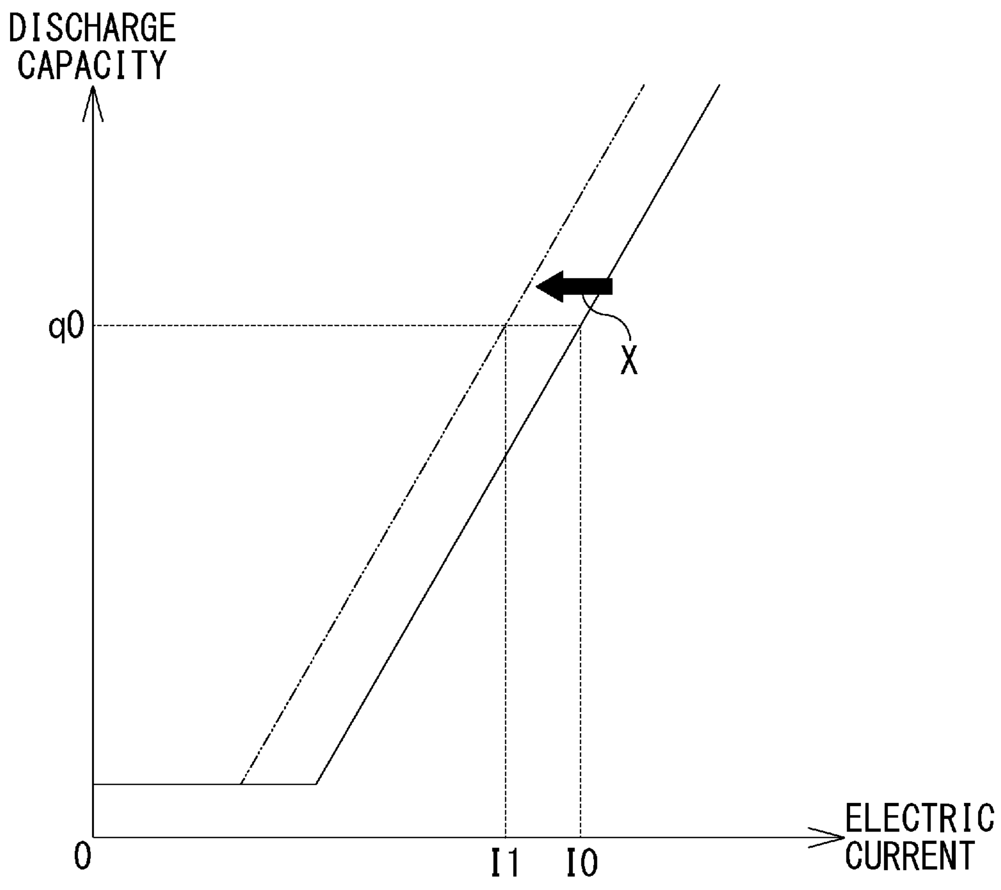
FIG. 2 is a graph illustrating the pump characteristic of a regulator included in the pump calibration system illustrated in FIG. 1.

In Step S4 which is a calibration step, the pump characteristic is calibrated on the basis of the first actual signal I1 (refer to the dash-dot-dot-dash line in FIG. 2). More specifically, the control device 16 adjusts the command signal according to the difference between the first actual signal I1 and the first reference signal I0 (refer to the dash-dot-dot-dash line in FIG. 2). In the present embodiment, the control device 16 adds, uniformly across the entire current region, the difference obtained by subtracting the first reference signal I0 from the first actual signal I1 to the pump characteristic obtained before the calibration. In other words, the control device 16 slides, by said difference, the pump characteristic obtained before the calibration (refer to the arrow X in FIG. 2). When the command signal is the first actual signal I1 or when the command signal is the first reference signal I0, in either case the opening degree of the unloader valve 14 is fixed to the predetermined value, and the upstream and downstream pressures of the unloader valve 14 are the same. Therefore, the flow rate of the working fluid passing through the unloader valve 14 is constant in either case. This means that the first actual signal I1 derived in the first actual signal derivation step is a command signal that is input to the current regulator 12 (the regulator 12 after replacement in the present embodiment) so that the discharge capacity of the hydraulic pump 11 becomes the reference discharge capacity q. Therefore, the pump characteristic can be calibrated so that the discharge capacity becomes equal to the reference discharge capacity q when the command signal is the first actual signal I1. When the pump characteristic is calibrated, the pump calibration method ends. Subsequently, the control device 16 controls the discharge capacity of the hydraulic pump 11 using the calibrated pump characteristic.

In the pump calibration system 1 according to the present embodiment, the pump characteristic can be calibrated with reference to the stored pump characteristic. The pump characteristic is calibrated on the basis of the first actual signal I1 with which the discharge pressure is equal to the discharge pressure detected when the first reference signal I0 is output. Therefore, it is possible to accurately and easily calibrate the pump characteristic without using a flowmeter.

Furthermore, in the pump calibration system 1 according to the present embodiment, the pump characteristic is calibrated according to the difference between the first actual signal I1 and the first reference signal I0. Therefore, the pump characteristic can be more easily calibrated.

Furthermore, in the pump calibration system 1 according to the present embodiment, the control device 16 causes the spool 14*a* of the unloader valve 14 to move to the first position A1 at which the opening degree is fixed to the predetermined value under the measurement condition. Therefore, the opening degree is easily held at the predetermined value. Thus, the state under the measurement condition is easily maintained so that a discharge pressure is detected; in other words, reproducibility is easily ensured.

Furthermore, in the pump calibration method according to the present embodiment, the first reference pressure pd is detected before the calibration condition is satisfied, and after the calibration condition is satisfied, a signal that is output to the regulator 12 is changed so that the discharge pressure becomes the first reference pressure pd, and thus the first actual signal I1 is derived. Therefore, the pump characteristic after the calibration condition is satisfied can be calibrated with reference to the pump characteristic obtained before the calibration condition is satisfied. Thus, the pump characteristic is calibrated on the basis of the first actual signal with which the discharge pressure is equal to the discharge pressure detected when the first reference signal is output. Therefore, it is possible to accurately and easily calibrate the pump characteristic without using a flowmeter.

Embodiment 2

A pump calibration system 1A according to Embodiment 2 is included in the hydraulic drive system 3 as with the pump calibration system 1 according to Embodiment 1 and includes the same elements as the pump calibration system 1 according to Embodiment 1. Therefore, the elements included in the pump calibration system 1A according to Embodiment 2 are assigned the same reference signs as the elements included in the pump calibration system 1 according to Embodiment 1, and description thereof will be omitted. Meanwhile, a pump calibration method that is performed by the pump calibration system 1A according to Embodiment 2 is partially different from the pump calibration method that is performed by the pump calibration system 1 according to Embodiment 1. Hereinafter, the pump calibration method that is performed by the pump calibration system 1A according to Embodiment 2 will be described. Note that regarding the pump calibration method that is performed by the pump calibration system 1A according to Embodiment 2, description of features that are the same as those of the pump calibration method that is performed by the pump calibration system 1 according to Embodiment 1 may be omitted.

Figure 5:
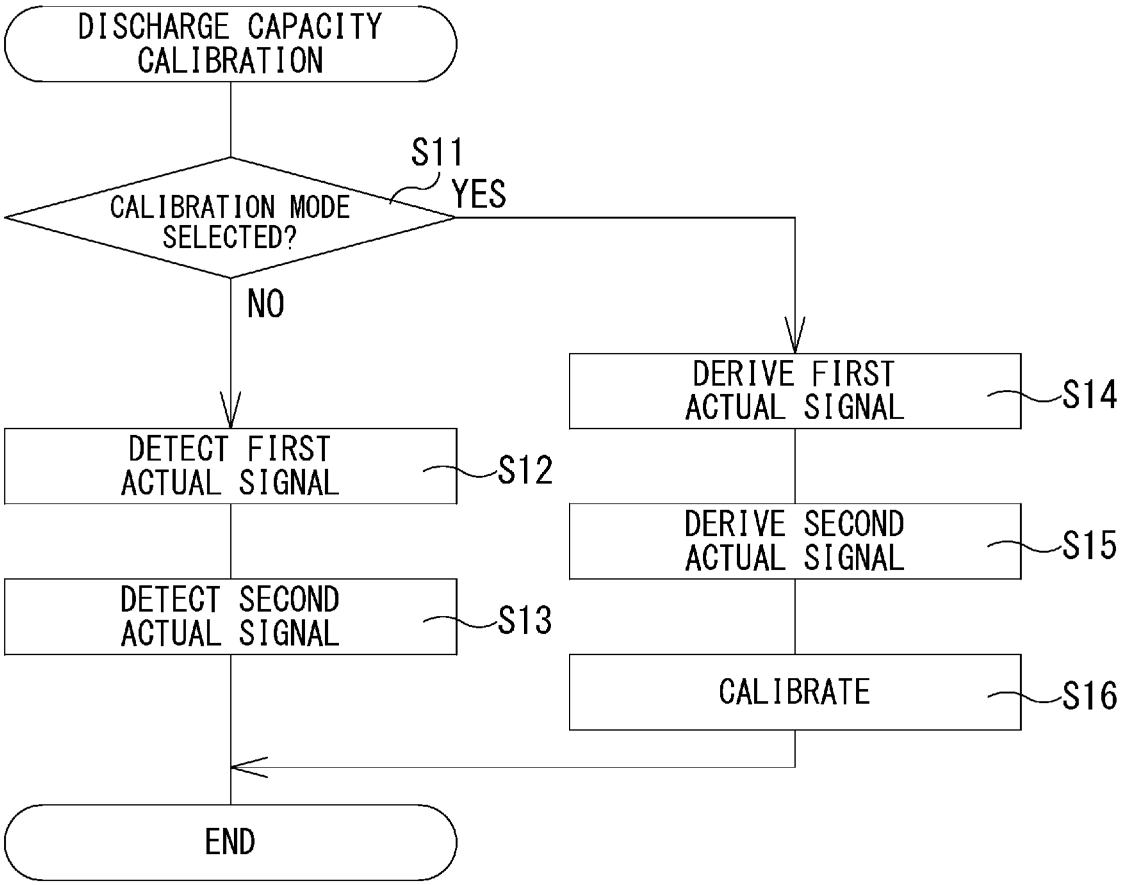
FIG. 5 is a flowchart illustrating the procedure in a pump calibration method performed by a pump calibration system according to Embodiment 2.

Similar to the foregoing, when a worker selects a mode via the input device not illustrated in the drawings, the control device 16 starts the pump calibration method whose flow is illustrated in FIG. 5. When the pump calibration method is started, the processing transitions to Step S11. In Step S11 which is a calibration condition determination step, the control device 16 determines whether the mode selected is the calibration mode, as in Step S1. When the initial state storage mode is selected, the processing transitions to Step S12. On the other hand, when the calibration mode is selected, the processing proceeds to Step S14.

Figure 6:
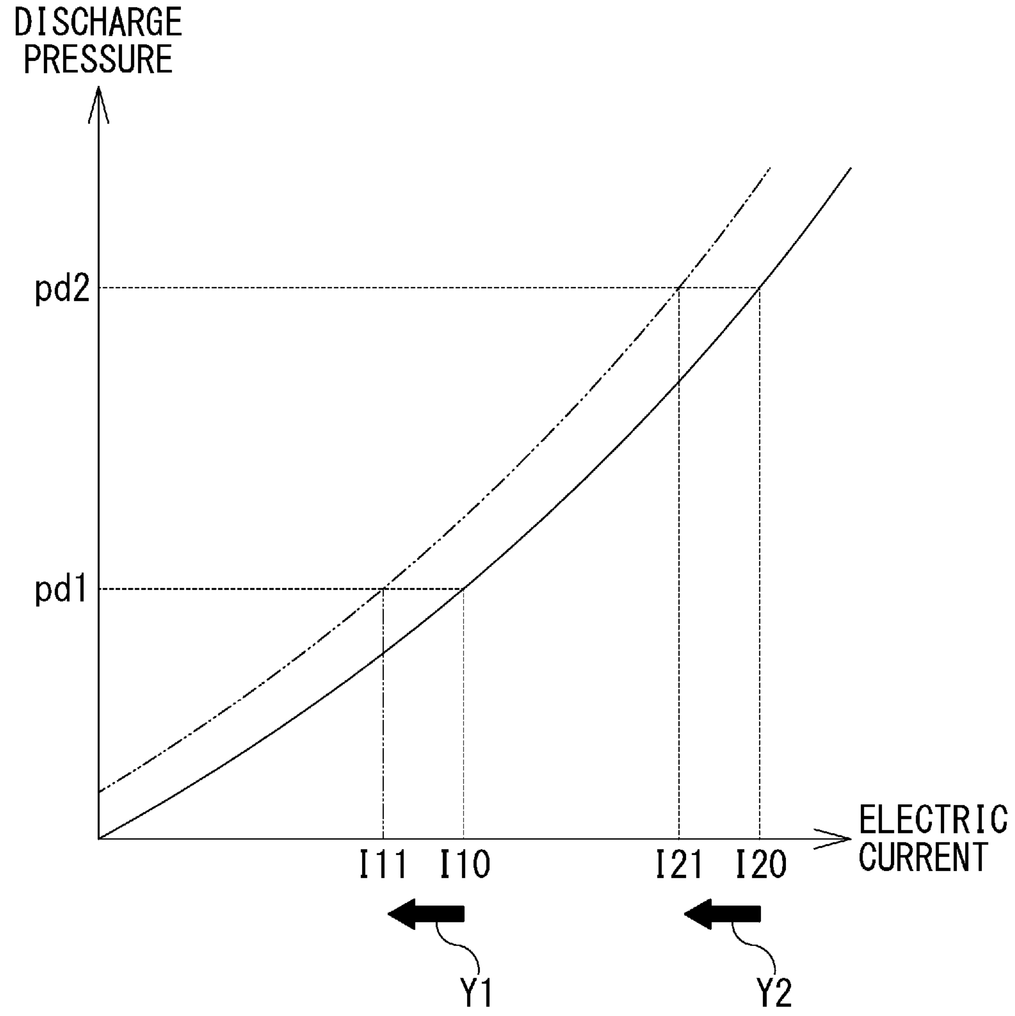
FIG. 6 is a graph illustrating the relationship between a discharge pressure and a command signal in the pump calibration system according to Embodiment 2.

In Step S12 which is a first reference voltage detection step, a first reference signal I10 is input to the regulator 12 under the reference condition (refer to the first reference signal I10 indicated in the graph in FIG. 6). After the first reference signal I10 is input to the regulator 12 and the discharge capacity is changed, the control device 16 stores a first reference pressure pd1 detected by the pressure sensor 15 (refer to the first reference pressure pd1 in FIG. 6). Note that the solid line in FIG. 6 is a graph indicating a change in the discharge pressure that is observed when the command signal is changed under the reference condition before the calibration condition is satisfied. Note that the first reference pressure pd1 is detected and stored before the calibration condition is satisfied. When the control device 16 stores the first reference pressure pd1 in advance, the processing proceeds to Step S13.

In Step S13 which is a second reference voltage detection step, a second reference signal I20 is input to the regulator 12 under the reference condition (refer to the second reference signal I20 indicated in the graph in FIG. 6). Note that the second reference signal I20 is a signal different from the first reference signal I10. In the present embodiment, the second reference signal I20 is a signal having a current value different from the current value of the first reference signal I10. After the second reference signal I20 is input to the regulator 12 and the discharge capacity is changed, the control device 16 stores a second reference pressure pd2 detected by the pressure sensor 15 (refer to the second reference pressure pd2 in FIG. 6). Note that the second reference pressure pd2 is detected and stored before the calibration condition is satisfied. When the control device 16 stores the second reference pressure pd2 in advance, the pump calibration method ends for the moment. Subsequently, when a mode is selected again via the input device, the pump calibration method is started, and the processing transitions to Step S11.

In Step S14 which is a first actual signal derivation step, the control device 16 changes the command signal from the first reference signal I10 under the reference condition (for example, refer to the arrow Y1 in FIG. 6). Thus, the discharge capacity of the hydraulic pump 11 changes. By changing the discharge pressure, the control device 16 derives a first actual signal I11 which is a signal with which the discharged pressure detected by the pressure sensor 15 is the first reference pressure pd1 (refer to the first actual signal I11 in FIG. 6). Note that the dash-dot-dot-dash line in FIG. 6 is a graph indicating a change in the discharge pressure that is observed when the command signal is changed under the reference condition after the calibration condition is satisfied. When the first actual signal I11 is derived, the processing transitions to Step S15.

In Step S15 which is a second actual signal derivation step, the control device 16 changes the command signal from the second reference signal I20 under the reference condition (for example, refer to the arrow Y2 in FIG. 6). Thus, the discharge capacity of the hydraulic pump 11 changes. By changing the discharge pressure, the control device 16 derives a second actual signal I21 which is a signal with which the discharged pressure detected by the pressure sensor 15 is the second reference pressure pd2 (refer to the second actual signal I21 in FIG. 6). When the second actual signal I21 is derived, the processing transitions to Step S16.

Figure 7:
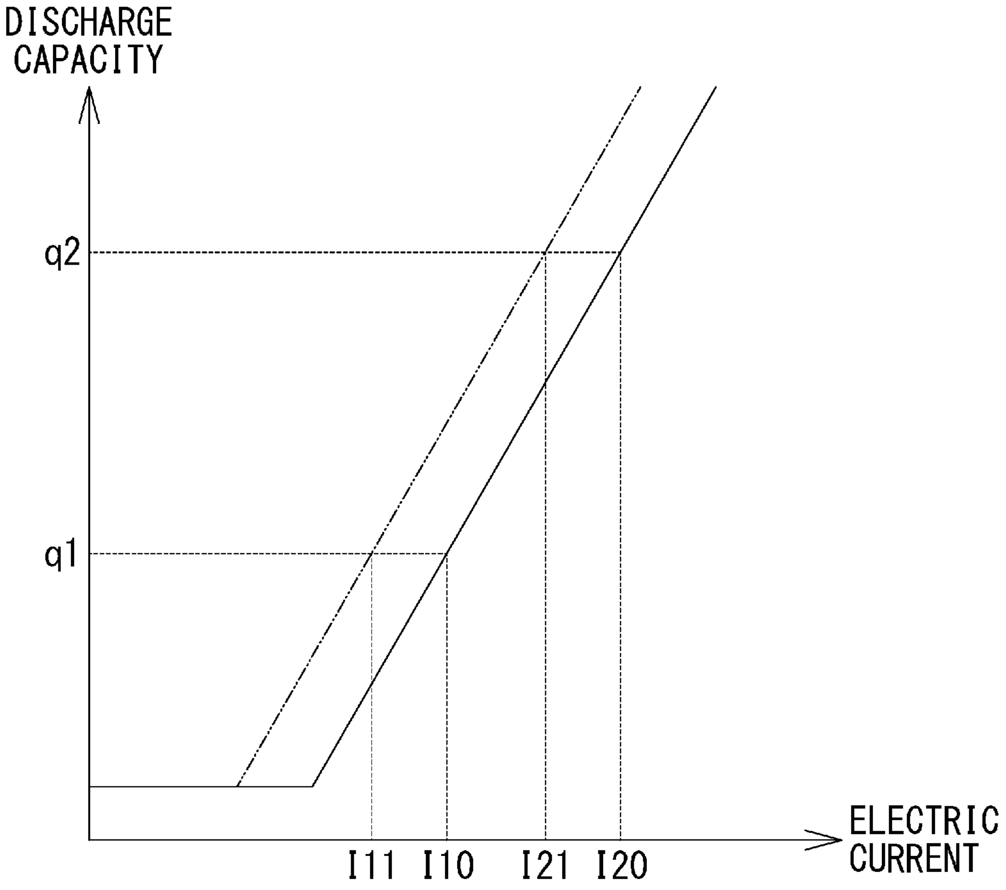
FIG. 7 is a graph illustrating the pump characteristic of a regulator included in the pump calibration system according to Embodiment 2.

In Step S16 which is a calibration step, the pump characteristic is calibrated on the basis of the first actual signal I11 and the second actual signal I21. More specifically, the pump characteristic of the hydraulic pump 11 is basically represented by a linear function (refer to the pump characteristic obtained before the calibration condition is satisfied that is indicated by the solid line in FIG. 7). Therefore, when the discharge capacity of the hydraulic pump 11 to be controlled is derived with respect to each of the two command signals, the pump characteristic can be determined. In the pump calibration system 1A, when the command signal is the first reference signal I10 or when the command signal is the first actual signal I11, in either case the first reference pressure pd1 is measured as a discharge pressure under a reference environment. Therefore, in either case, the discharge capacity of the hydraulic pump 11 is a first reference discharge capacity q1 (a first reference value). The same is true in the case where the command signal is the second reference signal I20 or the case where the command signal is the second actual signal I21; in either case, the discharge capacity of the hydraulic pump 11 is a second reference discharge capacity q2 (a second reference value). Therefore, after the calibration condition is satisfied, the discharge capacity of the hydraulic pump 11 is the first reference discharge capacity q1 when the command signal is the first actual signal I11, and the discharge capacity of the hydraulic pump 11 is the second reference discharge capacity q2 when the command signal is the second actual signal I21. Accordingly, the control device 16 can calibrate the pump characteristic to a function on which the discharge capacity is the first reference discharge capacity q1 when the command signal is the first actual signal I11 and the discharge capacity is the second reference discharge capacity q2 when the command signal is the second actual signal I21 (refer to the dash-dot-dot-dash line in FIG. 7). When the pump characteristic is calibrated in this manner, the pump calibration method ends.

In the pump calibration system 1A according to the present embodiment, the pump characteristic is calibrated on the basis of the first actual signal I11 and the second actual signal I21 with which the discharge pressure is equal to the discharge pressure detected when the second reference signal I20 is output. Therefore, it is possible to calibrate the pump characteristic on the basis of two signal values without converting a pressure into a flow rate. Thus, the pump characteristic is calibrated on the basis of the two signal values, meaning that it is possible to accurately and easily calibrate the pump characteristic.

Furthermore, in the pump calibration system 1A according to the present embodiment, the pump characteristic is calibrated to a function on which the discharge capacity is the first reference discharge capacity q1 when the command signal is the first actual signal I11 and the discharge capacity is the second reference discharge capacity q2 when the command signal is the second actual signal I21. Thus, the function can be easily calculated, and the pump characteristic can be more accurately calibrated.

The pump calibration system 1A according to Embodiment 2 produces substantially the same advantageous effects as does the pump calibration system 1 according to Embodiment 1. The pump calibration method according to Embodiment 2 also produces substantially the same advantageous effects as does the discharge capacity calibration according to Embodiment 1.

Other Embodiments

In the pump calibration systems 1, 1A according to the present embodiments, the regulator 12 includes the servo piston 12*a* and the electromagnetic proportional valve 12*b*, but this configuration is not limiting. For example, the servo piston 12*a* may be configured to be driven using a direct-acting motor or the like. In this case, the command signal is input to the direct-acting motor to change the discharge capacity. The unloader valve 14 may be a two-position spool valve that does not have the first position A1. In this case, in the unloader valve 14, the position of the spool 14*a* is controlled such that the opening degree is fixed to a predetermined value when the spool 14*a* is at a position corresponding to the third position A3. Thus, even with the two-position spool valve, the pump characteristic is calibrated as described above. In the control device 16, a portion that controls the regulator 12 and a portion that calibrates the pump characteristic may be configured separately.

Furthermore, in the pump calibration method according to the present embodiment, a worker selects a mode, and the pump characteristic is calibrated at an arbitrary timing; however, the pump characteristic may be regularly calibrated. Specifically, the calibration condition is set to include the lapse of a predetermined time and thus, the pump characteristic is regularly calibrated. Furthermore, the control device 16 may regularly measure, under the reference condition, a command signal with which the discharge pressure is the first reference pressure pd so that when the command signal is different from the first reference signal I0, the pump characteristic is calibrated. The number of reference signals and actual signals that are measured for calibration of the pump characteristic does not necessarily need to be one as in Embodiment 1 or two as in Embodiment 2. For example, the number of reference signals and actual signals may be three or more; when three or more reference signals and three or more actual signals are used, the pump characteristic may be derived using a linear approximation method such as the method of least squares.

The pump characteristic in the pump calibration method according to the present embodiment indicates the relationship between the command signal and the discharge capacity of the hydraulic pump 11, but may indicate the relationship between the command signal and the discharge flow rate of the hydraulic pump 11. Even in this case, the pump characteristic can be calibrated in substantially the same method as the above-described pump calibration method.

Exemplary Embodiments

A pump calibration system according to the first aspect includes: a hydraulic pump of a variable capacity type having a discharge capacity that is variable; a regulator that changes the discharge capacity of the hydraulic pump according to a command signal that is input to the regulator; an unloader valve disposed between the hydraulic pump and a tank and having an opening degree that is variable; a pressure sensor that measures a discharge pressure of the hydraulic pump; and a control device that controls the discharge capacity of the hydraulic pump by outputting the command signal to the regulator and calibrates a pump characteristic indicating a relationship between the command signal and the discharge capacity or a discharge flow rate of the hydraulic pump. The control device stores, as a first reference pressure in advance, a pressure detected by the pressure sensor when a first reference signal that is predetermined is output to the regulator under a measurement condition in which the opening degree of the unloader valve is fixed to a predetermined value and the hydraulic pump is driven to rotate at a predetermined number of revolutions, and when a predetermined calibration condition is satisfied, changes the command signal that is output to the regulator so that the discharge pressure detected by the pressure sensor under the measurement condition becomes the first reference pressure, and calibrates the pump characteristic on the basis of a first actual signal that is the command signal with which the discharge pressure is the first reference pressure.

According to this aspect, the pump characteristic can be calibrated with reference to the stored pump characteristic. The pump characteristic is calibrated on the basis of the first actual signal with which the discharge pressure is equal to the discharge pressure detected when the first reference signal is output. Therefore, it is possible to easily calibrate the pump characteristic without using a flowmeter.

In the pump calibration system according to the second aspect, in the pump calibration system according to the first aspect, the pump characteristic indicates the relationship of the discharge capacity or the discharge flow rate to be controlled by the regulator with respect to the command signal that is input to the regulator, and the control device calibrates the pump characteristic according to a difference between the first actual signal and the first reference signal.

According to this aspect, the pump characteristic is calibrated so as to adjust the command signal according to the difference between the first actual signal and the first reference signal. Therefore, the pump characteristic can be more easily calibrated.

In the pump calibration system according to the third aspect, in the pump calibration system according to the first or second aspect, the control device stores, as a second reference pressure in advance, a pressure detected by the pressure sensor when a second reference signal that is predetermined is output to the regulator under the measurement condition, and subsequently changes the command signal that is output to the regulator so that the discharge pressure detected by the pressure sensor under the measurement condition becomes the second reference pressure, and calibrates the pump characteristic on the basis of the first actual signal and a second actual signal that is the command signal with which the discharge pressure is the second reference pressure.

According to this aspect, the pump characteristic is calibrated on the basis of the first actual signal and the second actual signal with which the discharge pressure is equal to the discharge pressure detected when the second reference signal is output. Therefore, it is possible to calibrate the pump characteristic on the basis of the two signals without using a flowmeter. Therefore, the pump characteristic can be accurately calibrated.

In the pump calibration system according to the fourth aspect, in the pump calibration system according to the third aspect, the pump characteristic is a function indicating the discharge capacity or the discharge flow rate to be controlled by the regulator with respect to the command signal that is input to the regulator, and the control device calibrates the pump characteristic to a function on which the discharge capacity or the discharge flow rate has a first reference value when the command signal is the first actual signal and the discharge capacity or the discharge flow rate has a second reference value when the command signal is the second actual signal.

According to this aspect, the pump characteristic is calibrated to a function on which the discharge capacity or the discharge flow rate has the first reference value when the command signal is the first actual signal and the discharge capacity or the discharge flow rate has the second reference value when the command signal is the second actual signal. Thus, the function can be easily calculated, and the pump characteristic can be more accurately calibrated.

In the pump calibration system according to the fifth aspect, in the pump calibration system according to one of the first to fourth aspects, the unloader valve includes a valve body capable of moving to a first position at which the opening degree is fixed to the predetermined value, a second position at which a path between the hydraulic pump and the tank is blocked, and a third position at which the opening degree changes according to a stroke, and the control device causes the valve body of the unloader valve to move to the first position under the measurement condition.

According to this aspect, the control device causes the valve body of the unloader valve to move to the first position at which the opening degree is fixed to the predetermined value under the measurement condition. Therefore, the opening degree is easily held at the predetermined value. Thus, the state under the measurement condition is easily maintained so that a discharge pressure is detected.

A pump calibration method according to the sixth aspect is a pump calibration method for calibrating a pump characteristic indicating a relationship between a discharge capacity or a discharge flow rate of a hydraulic pump of a variable capacity type and a command signal that is input to a regulator in changing of the discharge capacity by the regulator. The pump calibration method includes: storing a first reference pressure detected by a pressure sensor when the regulator changes the discharge capacity of the hydraulic pump according to a first reference signal that is input to the regulator under a measurement condition in which an opening degree of an unloader valve disposed between the hydraulic pump and a tank is fixed to a predetermined value, the measurement condition being predetermined; deriving a first actual signal by changing the command signal that is output to the regulator under the measurement condition, the first actual signal being the command signal with which a discharge pressure of the hydraulic pump is the first reference pressure; and calibrating the pump characteristic on the basis of the first actual signal. In the storing, the first reference pressure is detected before a calibration condition that is predetermined is satisfied. In the deriving, after the calibration condition is satisfied, the command signal that is output to the regulator is changed to derive the first actual signal.

According to this aspect, the first reference pressure is detected before the calibration condition is satisfied, and after the calibration condition is satisfied, a signal that is output to the regulator is changed so that the discharge pressure becomes the first reference pressure, and thus the first actual signal is derived. Therefore, the pump characteristic after the calibration condition is satisfied can be calibrated with reference to the pump characteristic obtained before the calibration condition is satisfied. Thus, the pump characteristic is calibrated on the basis of the first actual signal with which the discharge pressure is equal to the discharge pressure detected when the first reference signal is output. Therefore, it is possible to easily calibrate the pump characteristic without using a flowmeter.

From the foregoing description, many modifications and other embodiments of the present disclosure would be obvious to a person having ordinary skill in the art. Therefore, the foregoing description should be interpreted only as an example and is provided for the purpose of teaching the best mode for carrying out the present disclosure to a person having ordinary skill in the art. Substantial changes in details of the structures and/or functions of the present disclosure are possible within the spirit of the present disclosure.

The invention claimed is:

1. A pump calibration system comprising:

a hydraulic pump of a variable capacity type having a discharge capacity that is variable;

a regulator that changes the discharge capacity of the hydraulic pump according to a command signal that is input to the regulator;

an unloader valve disposed between the hydraulic pump and a tank and having an opening degree that is variable;

a pressure sensor that measures a discharge pressure of the hydraulic pump; and a control device that controls the discharge capacity of the hydraulic pump by outputting the command signal to the regulator and calibrates a pump characteristic indicating a relationship between the command signal and the discharge capacity or a discharge flow rate of the hydraulic pump, wherein the control device includes an initial state storage mode and a calibration mode, in the initial state storage mode, the control device stores, as a first reference pressure in advance, a pressure detected by the pressure sensor when a first reference signal that is predetermined is output to the regulator under a measurement condition in which the opening degree of the unloader valve is fixed to a predetermined value and the hydraulic pump is driven to rotate at a predetermined number of revolutions, and in the calibration mode, the control device changes the command signal that is output to the regulator under the measurement condition, sets the first reference pressure to the discharge pressure detected by the pressure sensor, sets a first actual signal to the command signal with which the discharge pressure detected is the first reference pressure, and calibrates the pump characteristic according to a difference between the first actual signal and the first reference signal.

2. The pump calibration system according to claim 1, wherein the pump characteristic indicates the relationship of the discharge capacity or the discharge flow rate to be controlled by the regulator with respect to the command signal that is input to the regulator.

3. A pump calibration system comprising:

a hydraulic pump of a variable capacity type having a discharge capacity that is variable;

a regulator that changes the discharge capacity of the hydraulic pump according to a command signal that is input to the regulator;

an unloader valve disposed between the hydraulic pump and a tank and having an opening degree that is variable;

a pressure sensor that measures a discharge pressure of the hydraulic pump; and a control device that controls the discharge capacity of the hydraulic pump by outputting the command signal to the regulator and calibrates a pump characteristic indicating a relationship between the command signal and the discharge capacity or a discharge flow rate of the hydraulic pump, wherein:

the control device includes an initial state storage mode and a calibration mode, in the initial state storage mode, the control device stores, as a first reference pressure in advance, a pressure detected by the pressure sensor when a first reference signal that is predetermined is output to the regulator under a measurement condition in which the opening degree of the unloader valve is fixed to a predetermined value and the hydraulic pump is driven to rotate at a predetermined number of revolutions, and stores, as a second reference pressure in advance, a pressure detected by the pressure sensor when a second reference signal that is predetermined is output to the regulator under the measurement condition, and in the calibration mode, the control device changes the command signal that is output to the regulator under the measurement condition, sets the first reference pressure to the discharge pressure detected by the pressure sensor, sets a first actual signal to the command signal with which the discharge pressure detected is the first reference pressure, changes the command signal that is output to the regulator under the measurement condition, sets the second reference pressure to the discharge pressure detected by the pressure sensor, sets a second actual signal to the command signal with which the discharge pressure detected is the second reference pressure, and calibrates the pump characteristic on the basis of the first actual signal and the second actual signal.

4. The pump calibration system according to claim 3, wherein:

the pump characteristic is a function indicating the discharge capacity or the discharge flow rate to be controlled by the regulator with respect to the command signal that is input to the regulator; and the control device calibrates the pump characteristic to a function on which the discharge capacity or the discharge flow rate has a first reference value when the command signal is the first actual signal and the discharge capacity or the discharge flow rate has a second reference value when the command signal is the second actual signal.

5. The pump calibration system according to claim 1, wherein:

the unloader valve includes a valve body capable of moving to a first position at which the opening degree is fixed to the predetermined value, a second position at which a path between the hydraulic pump and the tank is blocked, and a third position at which the opening degree changes according to a stroke; and the control device causes the valve body of the unloader valve to move to the first position under the measurement condition.

6. A pump calibration method for calibrating a pump characteristic indicating a relationship between a discharge capacity or a discharge flow rate of a hydraulic pump of a variable capacity type and a command signal that is input to a regulator in changing of the discharge capacity by the regulator, the pump calibration method comprising:

storing a first reference pressure detected by a pressure sensor when the regulator changes the discharge capacity of the hydraulic pump according to a first reference signal that is input to the regulator under a measurement condition in which an opening degree of an unloader valve disposed between the hydraulic pump and a tank is fixed to a predetermined value, the measurement condition being predetermined;

deriving a first actual signal by changing the command signal that is output to the regulator under the measurement condition, the first actual signal being the command signal with which a discharge pressure of the hydraulic pump detected is the first reference pressure; and calibrating the pump characteristic according to a difference between the first actual signal and the first reference signal, wherein:

in the storing, the first reference pressure is detected before a calibration condition that is predetermined is satisfied; and in the deriving, after the calibration condition is satisfied, the command signal that is output to the regulator is changed to derive the first actual signal.

* * * * *